United States Patent
Murakami et al.

(10) Patent No.: US 10,126,470 B2
(45) Date of Patent: Nov. 13, 2018

(54) OPTICAL ABSORBER WHICH ABSORBS LIGHT BEAM

(71) Applicant: FANUC CORPORATION, Minamitsuru-gun, Yamanashi (JP)

(72) Inventors: Takafumi Murakami, Yamanashi (JP); Michinori Maeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 101 days.

(21) Appl. No.: 15/057,573

(22) Filed: Mar. 1, 2016

(65) Prior Publication Data

US 2016/0259096 A1 Sep. 8, 2016

(30) Foreign Application Priority Data

Mar. 2, 2015 (JP) .................................. 2015-040756

(51) Int. Cl.
*G02B 5/00* (2006.01)
*G02B 7/00* (2006.01)

(52) U.S. Cl.
CPC ............. *G02B 5/003* (2013.01); *G02B 7/008* (2013.01)

(58) Field of Classification Search
CPC ........ G02B 5/003; G02B 7/008; B23K 26/06; G01K 17/00; G01K 17/003; H01S 3/005
See application file for complete search history.

(56) References Cited

U.S. PATENT DOCUMENTS

| 4,864,098 A | 9/1989 | Basanese et al. |
| 5,237,454 A * | 8/1993 | Snyder ................ B23K 26/702 359/602 |
| 7,125,163 B2 * | 10/2006 | Eigler ..................... G01K 17/00 374/31 |
| 9,804,038 B2 * | 10/2017 | Hasegawa ............ B23K 26/032 |

FOREIGN PATENT DOCUMENTS

| JP | H01146385 A | 6/1989 |
| JP | 05-50757 U | 7/1993 |
| JP | 06252484 A | 9/1994 |
| JP | 2003-80390 A | 3/2003 |
| JP | 2005-140964 A | 6/2005 |
| JP | 2005140964 A * | 6/2005 |
| JP | 2006267615 A * | 10/2006 |
| JP | 201182298 A | 4/2011 |
| JP | 2012-204374 A | 10/2012 |
| WO | 2012100846 A1 | 8/2012 |
| WO | 2014063947 A1 | 5/2014 |

OTHER PUBLICATIONS

English language machine transilation of JP 2006-267615A.*
English language machine transilation of JP 2005-140964A.*

* cited by examiner

*Primary Examiner* — Bumsuk Won
*Assistant Examiner* — Ephrem Mebrahtu
(74) *Attorney, Agent, or Firm* — RatnerPrestia

(57) ABSTRACT

An optical absorber includes a first light-absorbing body which receives light incident from an entrance aperture and partially absorbs and reflects the incident light, and a second light-absorbing body which partially absorbs the incident light reflected by the first light-absorbing body and partially reflects the incident light toward the first light-absorbing body. The reflectance and light resistance of the first light-absorbing body are set higher than the reflectance and light resistance, respectively, of the second light-absorbing body.

7 Claims, 3 Drawing Sheets

OPTICAL ABSORBER WHICH ABSORBS LIGHT BEAM

FIELD OF THE INVENTION

The present invention relates to an optical absorber which absorbs a light beam.

DESCRIPTION OF THE RELATED ART

In the maintenance of an optical resonator or an excitation power supply mounted in an industrial laser oscillator, laser light is preferably oscillated and output without the laser light being passed out the laser oscillator. For safety of such maintenance, the laser oscillator includes a mechanism which completely absorbs and traps laser light.

Such a mechanism, i.e., an optical absorber uses a light-absorbing body which has a low reflectance for laser light and a high absorbency for absorbing laser light. A specific optical absorber is formed by performing, e.g., a surface treatment or coating which imparts a high laser light absorbance on a highly heat-conductive material such as a member made of copper or aluminum. Another optical absorber is designed to receive laser light a plurality of times, and absorbs the laser light by attenuating it stepwise.

Japanese Laid-open Patent Publication No. 2005-140964, for example, discloses an optical absorber including a reflecting member which diffuses laser light before the laser light enters the light-absorbing body. Japanese Laid-open Patent Publication No. 2003-80390 discloses an optical absorber designed to partially leak from its leakage aperture, laser light incident from its entrance aperture and absorb the leaked laser light into a light-absorbing body located downstream of the leakage aperture. Japanese Laid-open Utility Model Publication No. H5-50757 and Japanese Laid-open Patent Publication No. 2012-204374 disclose optical absorbers in which reflectance of an end of an absorbing body is improved.

SUMMARY OF INVENTION

However, a reflecting member which diffuses laser light is necessary in Japanese Laid-open Patent Publication No. 2005-140964, while it is necessary to provide a light-absorbing body as well as to form a leakage aperture in the optical absorber in Japanese Laid-open Patent Publication No. 2003-80390. A surface treatment for increasing the reflectance is necessary in Japanese Laid-open Utility Model Publication No. H5-50757 and Japanese Laid-open Patent Publication No. 2012-204374.

In this manner, an additional member or an additional surface treatment is necessary in the conventional techniques. This increases the number of components or the number of processes, leading to a rise in manufacturing cost, problems related to quality or reliability, or a large, complicated optical absorber.

The present invention has been made in consideration of the above-mentioned situations, and has as its object to provide a highly reliable, small optical absorber which can be manufactured at a low cost with neither an additional member nor an additional surface treatment.

In order to achieve the above-mentioned object, the first invention provides an optical absorber including a first light-absorbing body and a second light-absorbing body. The first light-absorbing body receives light incident from an entrance aperture and partially absorbs and reflects the incident light. The second light-absorbing body partially absorbs the incident light reflected by the first light-absorbing body and partially reflects the incident light toward the first light-absorbing body. The reflectance and light resistance of the first light-absorbing body are set higher than the reflectance and light resistance, respectively, of the second light-absorbing body.

According to the second invention, in the first invention, a space surrounded by the first light-absorbing body and the second light-absorbing body is closed except for the entrance aperture.

According to the third invention, in the first or second invention, the incident light and the light reflected by the second light-absorbing body at least partially overlap each other in the first light-absorbing body.

According to the fourth invention, in any one of the first to third inventions, the optical absorber further includes a cooling unit which cools at least one of the first light-absorbing body and the second light-absorbing body.

According to the fifth invention, in the fourth invention, the optical absorber further includes a connecting member which connects the first light-absorbing body and the second light-absorbing body to each other to transfer heat.

According to the sixth invention, in any one of the first to fifth inventions, the first light-absorbing body has a reflectance which is between 40% and 60%.

According to the seventh invention, in any one of the first to sixth inventions, the second light-absorbing body has a reflectance which is greater than 0% but is smaller than or equal to 10%.

These and other objects, features, and advantages of the present invention will become more apparent from a detailed description of typical embodiments of the present invention which are illustrated in the accompanying drawings.

DETAILED DESCRIPTION

Figure 1:
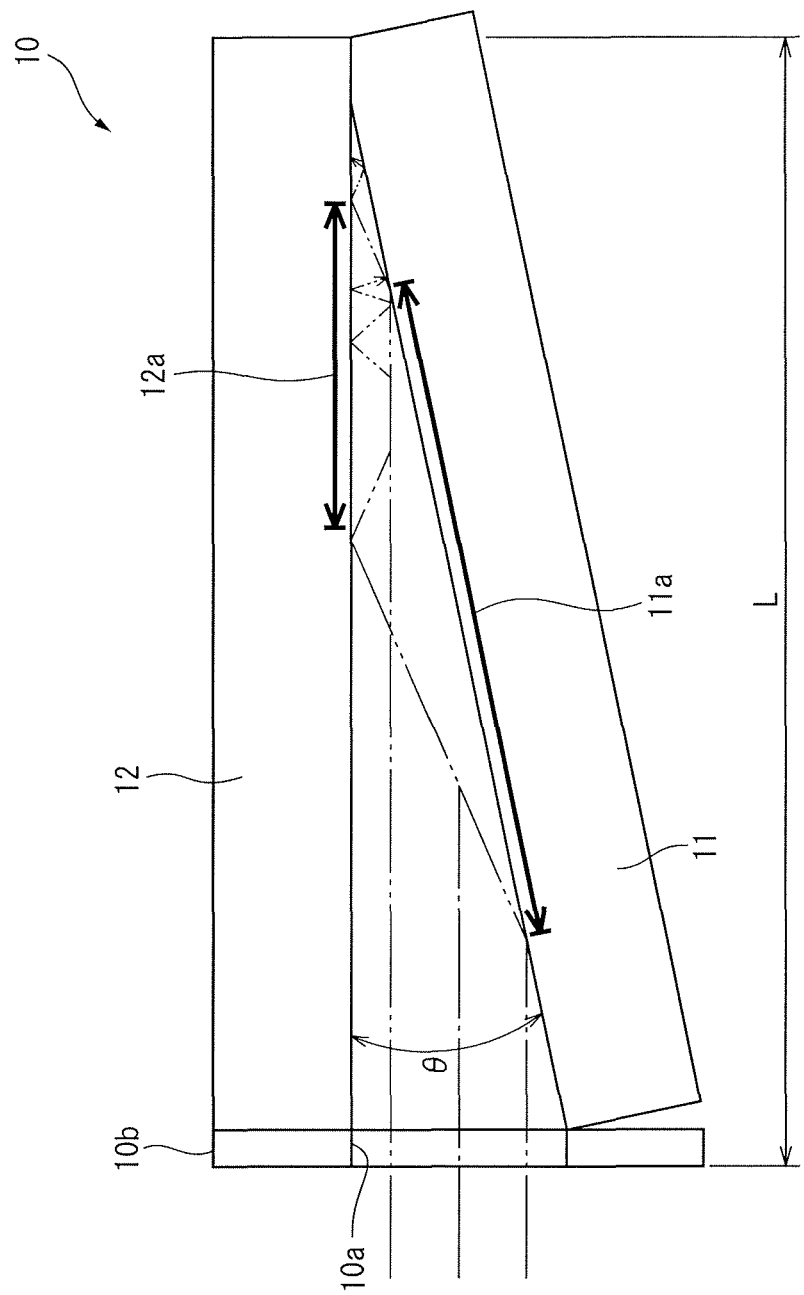
FIG. 1 is a side view illustrating an optical absorber based on a first embodiment of the present invention.

Embodiments of the present invention will be described below with reference to the accompanying drawings. The same reference numerals denote the same members in the following drawings. For the sake of a better understanding, these drawings use different scales as appropriate.

FIG. 1 is a side view illustrating an optical absorber based on a first embodiment of the present invention. An optical absorber 10 includes a first light-absorbing body 11 and a second light-absorbing body 12 which make an acute angle with each other, as depicted as FIG. 1. An annular member 10b including an entrance aperture 10a is disposed at the end portions of the first light-absorbing body 11 and the second light-absorbing body 12. The optical absorber 10 may be formed by only the first light-absorbing body 11 and the second light-absorbing body 12, instead of employing the annular member 10b.

The first light-absorbing body 11 and the second light-absorbing body 12 illustrated as FIG. 1 form rectangular parallelepipeds defined by planes, but the first light-absorbing body 11 and the second light-absorbing body 12 may partially include curved surfaces. Such an optical absorber 10 is used in the maintenance of an optical resonator or an excitation power supply mounted in a laser oscillator (not illustrated).

Incident light is received by the first light-absorbing body 11 through the entrance aperture 10*a*, as represented as FIG. 1. The first light-absorbing body 11 has a relatively high light resistance and therefore has a relatively high reflectance for laser light. In contrast to this, the second light-absorbing body 12 has a light resistance lower than that of the first light-absorbing body 11 and therefore has a reflectance for laser light lower than that of the first light-absorbing body 11.

Figure 3:
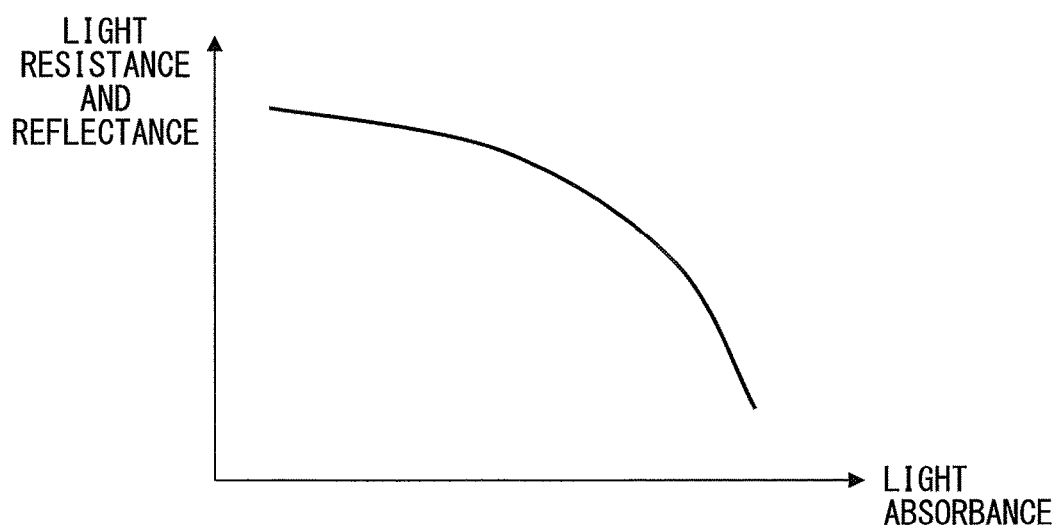
FIG. 3 is a graph representing the relationship between the light resistance and reflectance and the light absorbance.

FIG. 3 is a graph representing the relationship between the light resistance and reflectance and the light absorbance. FIG. 3 represents the light resistance and reflectance on the ordinate and the light absorbance on the abscissa. As illustrated as FIG. 3, the higher the light resistance and reflectance, the lower the light absorbance. The lower the light resistance and reflectance, the higher the light absorbance. Therefore, the second light-absorbing body 12 has a light absorbance higher than that of the first light-absorbing body 11.

As described above, the optical absorber 10 according to the present invention includes a first light-absorbing body 11 having a high light resistance against laser light, and a second light-absorbing body 12 which has a high light absorbance for absorbing laser light. Accordingly, the optical absorber 10 based on the present invention has opposite properties: durability against laser light and the property of efficiently absorbing laser light.

As depicted as FIG. 1, when laser light enters the optical absorber 10 from the entrance aperture 10*a* as incident light, it is first received by a primary light-receiving surface 11*a* of the first light-absorbing body 11. Although the intensity of incident light is relatively high, the light resistance and reflectance of the first light-absorbing body 11 are high. Therefore, even when the first light-absorbing body 11 receives laser light as incident light, the first light-absorbing body 11 does not generate heat upon absorption of the laser light and suffer damage and deterioration. A part of the received laser light is absorbed into the first light-absorbing body 11. A remaining laser light that cannot be absorbed by the first light-absorbing body 11 is reflected toward the second light-absorbing body 12 as reflected light.

The reflected light is received by a secondary light-receiving surface 12*a* of the second light-absorbing body 12, as depicted as FIG. 1. The light resistance and reflectance of the second light-absorbing body 12 are low, as described earlier. However, laser light received by the second light-absorbing body 12 is light reflected by the first light-absorbing body 11, which has a relatively low intensity. Therefore, although the second light-absorbing body 12 has a low light resistance, the second light-absorbing body 12 does not generate heat upon absorption of the laser light and suffer damage and deterioration.

Because the light absorbance of the second light-absorbing body 12 is high, the second light-absorbing body 12 absorbs a large part of the reflected light and partially reflects the reflected light toward the first light-absorbing body 11. As can be seen from FIG. 1, such laser light reflection is repeated alternately between the first light-absorbing body 11 and the second light-absorbing body 12, so that the laser light is absorbed into the optical absorber 10.

In particular, referring to FIG. 1, the end portions of the first light-absorbing body 11 and the second light-absorbing body 12 located downstream in the direction in which laser light propagates are connected to each other. This means that the space surrounded by the first light-absorbing body 11 and the second light-absorbing body 12 is closed except for the entrance aperture 10*a*. With this arrangement, no laser light leaks out of the optical absorber 10, thus improving the safety of the optical absorber 10.

Since the end portions of the first light-absorbing body 11 and the second light-absorbing body 12 are connected to each other, the number of reflections within the optical absorber 10 can be increased to reliably absorb laser light. When the first light-absorbing body 11 and the second light-absorbing body 12 are directly connected to each other, it is obviously possible to prevent an increase in number of components and, in turn, to manufacture an optical absorber 10 at a low cost.

As described above, in the present invention, the first light-absorbing body 11 that receives laser light first has a light resistance and reflectance higher than those of the second light-absorbing body 12 that receives light reflected by the first light-absorbing body 11. This makes it possible to reduce damage inflicted on the first light-absorbing body 11 by high-intensity incident light. Since the second light-absorbing body 12 receives reflected light attenuated by the first light-absorbing body 11, damage inflicted on the second light-absorbing body 12 can be suppressed. Further, the second light-absorbing body 12 has a light absorbance higher than that of the first light-absorbing body 11 and can therefore efficiently absorb reflected light.

Again as described above, in the present invention, since the optical absorber 10 is formed using only the first light-absorbing body 11 and the second light-absorbing body 12 having different reflectances and light resistances, neither an additional member nor an additional surface treatment may be used. Therefore, according to the present invention, a highly reliable optical absorber 10 can be manufactured at a low cost.

In this respect, when the second light-absorbing body 12 has the same light resistance and reflectance as those of the first light-absorbing body 11, the light absorbance of the second light-absorbing body 12 is low (see FIG. 3). Therefore, the number of reflections within the optical absorber 10 has to be increased, leading to a large optical absorber 10.

When the first light-absorbing body 11 has the same light resistance and reflectance as those of the second light-absorbing body 12, the light resistance of the first light-absorbing body 11 is low, although its light absorbance is high. In other words, the light resistance of the entire optical absorber 10 is low. Therefore, the incident angle of light incident on the first light-absorbing body 11 has to be increased to reduce the intensity of laser light per unit area of the first light-absorbing body 11. This results in a large optical absorber 10.

In contrast to this, in the present invention, since the first light-absorbing body 11 and the second light-absorbing body 12 having different reflectances and light resistances are used, an increase in size of the optical absorber 10 can be avoided, as mentioned earlier.

It is generally difficult to stably form a second light-absorbing body 12 having a low light resistance and a low reflectance, and the use of a second light-absorbing body 12 having a low light resistance and a low reflectance results in the manufacture of an optical absorber 10 at a higher cost. In the present invention, since such a second light-absorbing body 12 forms only a part of the optical absorber 10, the manufacture of an optical absorber 10 according to the present invention costs less.

The larger the angle θ that the first light-absorbing body 11 and the second light-absorbing body 12 make with each other, the smaller the size of the optical absorber 10. In this case, however, because the area of incidence of light incident on the first light-absorbing body 11 is small, the intensity of laser light per unit area of the first light-absorbing body 11 is high.

Especially the primary light-receiving surface 11a of the first light-absorbing body 11 is preferably plated with black nickel. This partially increases the light resistance and reflectance for laser light. The entire surface of the first light-absorbing body 11 facing the second light-absorbing body 12 may be plated with black nickel, as a matter of course. In such a case, the optical absorber 10 can be downsized by setting the angle θ relatively large.

When the light resistance and reflectance of the first light-absorbing body 11 are low, the angle θ has to be small to reduce the intensity of laser light per unit area of the first light-absorbing body 11 low. In this case, the optical absorber 10 has a large entire length L (see FIG. 1). Therefore, in order to make the entire length L of the optical absorber 10 small, the first light-absorbing body 11 is preferably plated with black nickel to increase its light resistance and reflectance.

Especially the secondary light-receiving surface 12a of the second light-absorbing body 12 is preferably processed with a blackening chromium treatment. This makes it possible to increase the light absorbance by partially setting the light resistance and reflectance for laser light low. A blackening chromium treatment may be performed on the entire surface of the second light-absorbing body 12 facing the first light-absorbing body 11, as a matter of course. In this case, laser light can be absorbed while reducing the number of reflections within the optical absorber 10.

Figure 2:
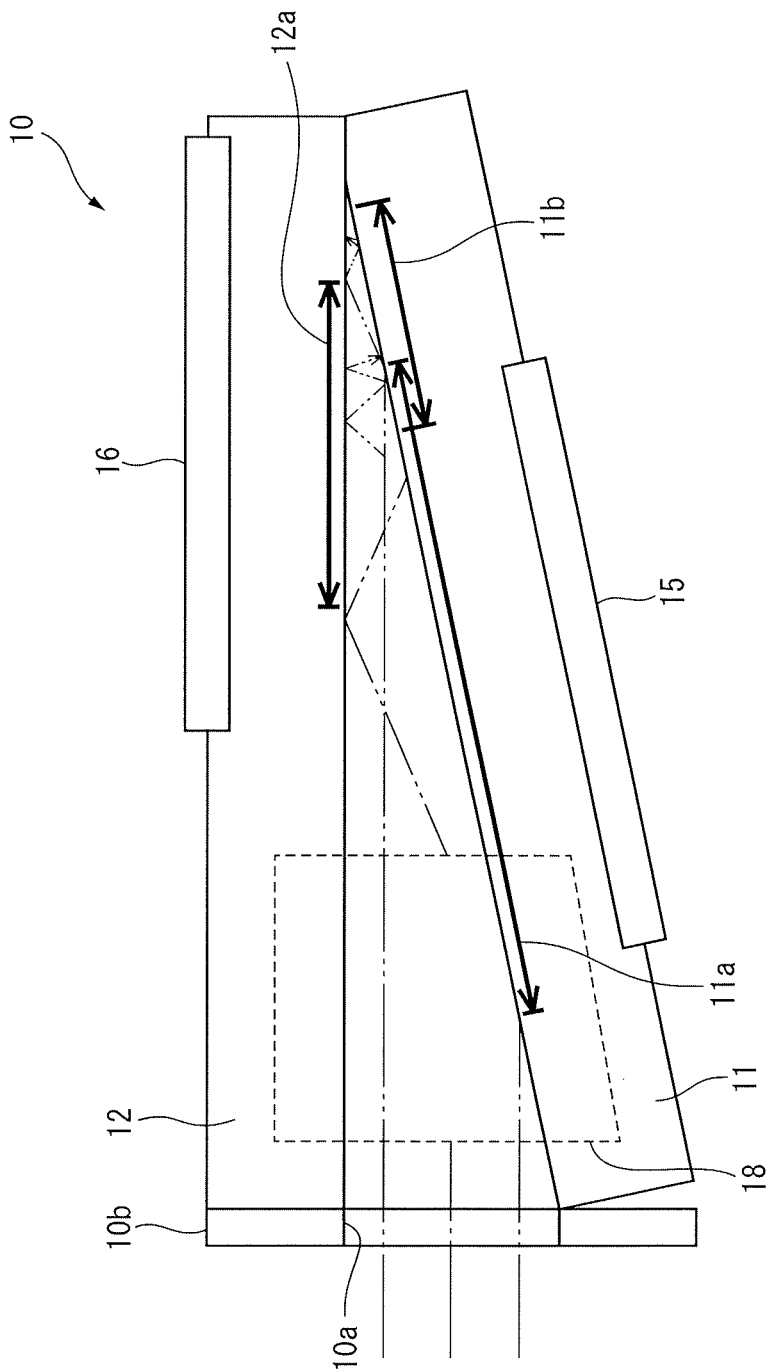
FIG. 2 is a side view illustrating an optical absorber based on a second embodiment of the present invention.

FIG. 2 is a side view illustrating an optical absorber based on a second embodiment of the present invention. Referring to FIG. 2, when laser light enters an optical absorber 10 from an entrance aperture 10a as incident light, it is first received by a primary light-receiving surface 11a of a first light-absorbing body 11. A part of the received laser light is absorbed into the first light-absorbing body 11. A remaining part of the laser light that cannot be absorbed by the first light-absorbing body 11 is reflected toward a second light-absorbing body 12 as reflected light.

Then, the reflected light is received by a secondary light-receiving surface 12a of the second light-absorbing body 12. The second light-absorbing body 12 absorbs a large part of the reflected light and partially reflects the reflected light toward the first light-absorbing body 11. Light reflected by the second light-absorbing body 12 is received by a tertiary light-receiving surface 11b of the first light-absorbing body 11. The reflected light is partially absorbed into the first light-absorbing body 11 and the remaining part is reflected toward the second light-absorbing body 12 again.

As can be seen from FIG. 2, in the second embodiment, the primary light-receiving surface 11a that receives incident light and the tertiary light-receiving surface 11b that receives light reflected by the second light-absorbing body 12 partially overlap each other. In other words, in the second embodiment, the first light-absorbing body 11 and the second light-absorbing body 12 are arranged such that incident light and light reflected by the second light-absorbing body 12 at least partially overlap each other in the first light-absorbing body 11. Therefore, the angle θ that the first light-absorbing body 11 and the second light-absorbing body 12 make with each other can be set relatively large, thus fabricating a small, lightweight optical absorber 10 at less cost.

Further, referring to FIG. 2, a first cooling unit 15 is disposed on the surface, opposite to the light-receiving surface, of the first light-absorbing body 11, and a second cooling unit 16 is disposed on the surface, opposite to the light-receiving surface, of the second light-absorbing body 12. The first cooling unit 15 and the second cooling unit 16 serve as cooling plates or radiating fins which pass, e.g., a coolant inside.

The first light-absorbing body 11 and the second light-absorbing body 12 absorb laser light and generate heat, while the first cooling unit 15 and the second cooling unit 16 suppress heat generation. This makes it possible to prevent the first light-absorbing body 11 and the second light-absorbing body 12 from suffering damage due to heat generation to improve the life and reliability of the optical absorber 10. Instead of using the first cooling unit 15 and the second cooling unit 16, a passage may be formed within the first light-absorbing body 11 and the second light-absorbing body 12 to pass a coolant through the passage.

FIG. 2 illustrates a connecting member 18 which connects the first light-absorbing body 11 and the second light-absorbing body 12 to each other. The connecting member 18 is attached to the side surfaces of the first light-absorbing body 11 and the second light-absorbing body 12 to transfer heat between the first light-absorbing body 11 and the second light-absorbing body 12. When such a connecting member 18 is provided, one of the first cooling unit 15 and the second cooling unit 16 can be omitted. This keeps the manufacturing cost of the optical absorber 10 low.

Figure 4:
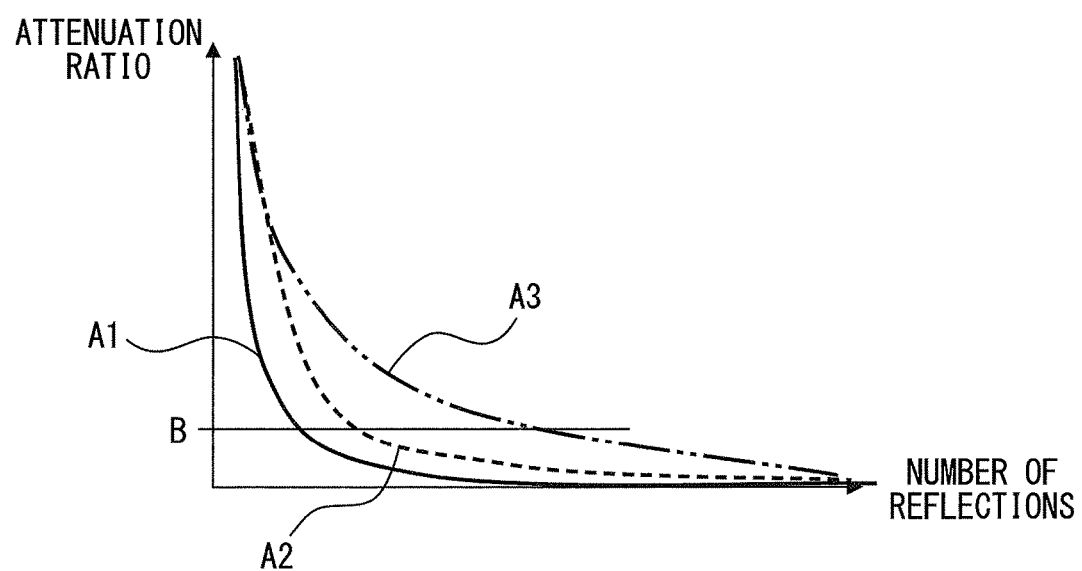
FIG. 4 is a graph representing the relationship between the attenuation ratio and the number of reflections.

FIG. 4 is a graph representing the relationship between the attenuation ratio and the number of reflections. FIG. 4 represents the attenuation ratio on the ordinate and the number of reflections on the abscissa. FIG. 4 represents a required attenuation ratio B which is necessary for the optical absorber 10.

FIG. 4 illustrates a curve A1 obtained when the reflectances of both the first light-absorbing body 11 and the second light-absorbing body 12 are set to 10%. FIG. 4 further illustrates a curve A2 obtained when the reflectance of the first light-absorbing body 11 is set to 50% and the reflectance of the second light-absorbing body 12 is set to 10%. FIG. 4 moreover illustrates a curve A3 obtained when the reflectances of both the first light-absorbing body 11 and the second light-absorbing body 12 are set to 50%.

As can be seen from FIG. 4, in the case of the curve A1, the attenuation ratio can be set lower than the required attenuation ratio B by a relatively small number of reflections. In this case, however, the light resistance is low, as is obvious from FIG. 3. Therefore, as mentioned earlier, the angle θ has to be small, resulting in a large optical absorber 10. In the case of the curve A3, the entire length L of the optical absorber 10 is preferably set large because of a large number of reflections, although the light resistance is high.

In contrast, in the case of the curve A2, the attenuation ratio can be set lower than the required attenuation ratio B without increasing the number of reflections. Accordingly, the reflectance of the first light-absorbing body 11 is preferably about 50% such as a value between 40% and 60%, and the reflectance of the second light-absorbing body 12 is preferably about 10% such as a value which is greater than 0% and is smaller or equal to be 20%. In such a case, it is obviously easy to provide a highly reliable optical absorber 10 at a low cost.

Advantageous Effects of Invention

In the first invention, since incident light enters a first light-absorbing body having a high reflectance and a high light resistance, even high-intensity incident light does not damage the first light-absorbing body. Reflected light is guided and absorbed into a second light-absorbing body having a low reflectance and a low light resistance. Since the reflected light is attenuated by the first light-absorbing body, the second light-absorbing body does not suffer damage, either. In this way, the use of only the first light-absorbing body and the second light-absorbing body having different reflectances and light resistances allows the manufacture of a highly reliable optical absorber at a low cost.

In the second invention, since portions other than the entrance aperture are closed, safety can be improved. Since the number of reflections within the optical absorber can be increased, laser light can be reliably absorbed into the optical absorber.

In the third invention, the angle that the first light-absorbing body and the second light-absorbing body make with each other can be set relatively large, thus fabricating a small, lightweight optical absorber at less cost.

In the fourth invention, since the temperature of the light-absorbing body can be kept low by the cooling unit, the life of the optical absorber can be prolonged to improve the safety and reliability of the optical absorber.

In the fifth invention, even when only one of the first light-absorbing body and the second light-absorbing body is equipped with a cooling unit, a connecting member enables heat transfer. Therefore, only one cooling unit suffices, thus keeping the manufacturing cost less.

In the sixth and seventh inventions, a highly reliable optical absorber can be provided at a low cost with a relatively simple configuration.

Although the present invention has been described with reference to typical embodiments, it could be understood by those skilled in the art that the above-mentioned changes and various other changes, omissions, and additions may be made without departing from the scope of the present invention.

The invention claimed is:

1. An optical absorber comprising:
   a first light-absorbing body which receives light incident from an entrance aperture and partially absorbs and reflects the incident light; and
   a second light-absorbing body which partially absorbs the incident light reflected by the first light-absorbing body and partially reflects the incident light toward the first light-absorbing body,
   wherein the first light-absorbing body and the second light-absorbing body form rectangular parallelepipeds defined by planes,
   wherein the end portions of the first light-absorbing body and the second light-absorbing body located downstream in the direction in which laser light propagates are connected to each other,
   wherein a reflectance and a light resistance of the first light-absorbing body are set higher than a reflectance and a light resistance, respectively, of, the second light-absorbing body,
   wherein the first light-absorbing body has a primary light receiving surface which receives primary light incident from the entrance aperture and partially absorbs and reflects the incident light as a secondary light,
   wherein the second light-absorbing body has a secondary light receiving surface which partially absorbs the incident secondary light reflected by the first light-absorbing body and partially reflects the incident secondary light toward a tertiary light receiving surface of the first light-absorbing body as tertiary light, and
   wherein the primary light receiving surface and the tertiary light receiving surface of the first light-absorbing body overlap each other.

2. The optical absorber according to claim 1, wherein a space surrounded by the first light-absorbing body and the second light-absorbing body is closed except for the entrance aperture.

3. The optical absorber according to claim 1, wherein the incident light and the light reflected by the second light-absorbing body at least, partially overlap each other in the first light-absorbing body.

4. The optical absorber according to claim 1, further comprising a cooling unit which cools at least one of the first light-absorbing body and the second light-absorbing body.

5. The optical absorber according to claim 4, further comprising a connecting member which connects the first light-absorbing body and the second light-absorbing body so as to transfer heat.

6. The optical absorber according to claim 1, wherein the first light-absorbing body has a reflectance which is between 40% and 60%.

7. The optical absorber according to claim 1, wherein the second light-absorbing body has a reflectance which is greater than 0% but is smaller than or equal to 10%.

* * * * *